3,729,533
Patented Apr. 24, 1973

3,729,533
PROCESS FOR PRODUCING TRIBUTYL PHOSPHATE HAVING LOW SODIUM ION CONTENT
Wallace F. Runge, Terre Haute, Ind., assignor to Commercial Solvents Corporation
No Drawing. Filed Nov. 2, 1970, Ser. No. 86,384
Int. Cl. C07f 9/16
U.S. Cl. 260—990                     4 Claims

ABSTRACT OF THE DISCLOSURE

A process for the production of tributyl phosphate (TBP) characterized by exceptionally low concentration of sodium ion comprising the steps of extracting the TBP twice with aqueous ammonium sulfate solution.

BACKGROUND OF THE INVENTION

This invention relates to purified tributyl phosphate. In a particular aspect this invention relates to purified tributyl phosphate having exceptionally low sodium ion content.

Tri-n-butyl phosphate has many uses. It is used to extract uranium ion from solutions; it is used as an antifoam agent in numerous and diverse foaming problems; it is used as a dispersing agent for insecticides and herbicides. Many other uses are also known.

Tributyl phosphate is usually manufactured by reacting phosphorous oxychloride with n-butanol in a ratio of 1:<3. The reaction releases hydrogen chloride and the reaction product is neutralized with sodium hydroxide solution whereupon two immiscible layers are formed, the upper consisting of crude TBP and the lower consisting of principally aqueous sodium chloride, some butanol and unreacted sodium hydroxide. The upper layer is separated, then extracted with 1% aqueous sodium hydroxide solution. Residual butanol is separated by distillation and the TBP is extracted twice with 1% sodium hydroxide solution. The TBP is then vacuum dried, after which it is suitable for market.

The sodium ion content of the product obtained by the aforedescribed process is usually within the range of 40-70 p.p.m., which is suitable for many applications. However TBP of this quality is unsatisfactory in some commercial applications, and accordingly a need exists for an improved process.

SUMMARY OF THE INVENTION

It is an object of this invention to provide an improved process for the production of TBP.

It is another object of this invention to provide an improved process for the production of TBP having exceptionally low sodium ion content.

Other objects of this invention will be apparent to those skilled in the art from the description herein.

It has been discovered that in the recovery process for the TBP that extracting the TBP with 3% ammonium sulfate solution in place of the 1% caustic soda employed in the final two extraction steps of the prior art results in a product exceptionally low in sodium ion concentration.

DETAILED DESCRIPTION

In accordance with the previous process, the crude tributyl phosphate containing hydrogen chloride is obtained by reacting butanol with phosphorous oxychloride in a ratio greater than 3:1. The hydrogen chloride is neutralized by thoroughly mixing the reaction mixture with an equivalent or more of sodium hydroxide in aqueous solution. The mixture forms 2 layers, of which the upper is the TBP layer. The layers are separated, e.g. by decantation, and the unreacted butanol is distilled from the tributyl phosphate. In the prior process, this TBP layer was extracted three times with 1-2 volumes of about a 1% sodium hydroxide solution. According to the process of the present invention, however, a dilute aqueous ammonium sulfate solution is substituted for the sodium hydroxide solution in the 2nd and 3rd extractions, thereby producing TBP having exceptionally low sodium ion content. The TBP so-treated is then dried under reduced pressure.

The dilute ammonium sulfate solution employed in the practice of this invention is generally in the range of 0.1 to about 5% by weight concentration, and about 1-4% is preferred. About 2-3% is particularly preferred.

The extractions are made at ambient temperatures and either batch extraction or continuous countercurrent extraction can be used. If batch extraction is employed, 1-2 volumes of ammonium sulfate solution per volume of TBP is generally used. It is understood however that the volume is not critical and from 0.5 to 10 volumes of ammonium sulfate solution per volume of TBP can be used with good success. Below a volume ratio of 0.5:1 however, the efficiency becomes progressively poorer, and above 10:1, the volume involved is so large that it becomes difficult to handle with no advantages to be gained. In the case of batch extraction, the mixture is allowed to stand until good separation of layers takes place, then the layers are separated by any convenient method, e.g. by decantation.

When counter-current extraction is employed, the total relative volumes are of little significance. Generally the ammonium sulfate solution is introduced into a countercurrent extraction apparatus, e.g. a column or tower, at a rate of about 1-3 times (volumes per minute) that of the TBP. Conveniently a column or tower is filled to somewhat less than full capacity with ammonium sulfate solution. TBP is introduced at or near the bottom, of the column, preferably through a spray head or the like to break up the stream into droplets; the TBP, being less dense than the ammonium sulfate, rises to the top of the column where it is removed by any suitable means, e.g. a decanter head. Ammonium sulfate solution is introduced at or near the top of the column, preferably below the TBP interface, and is withdrawn at the same rate from the bottom of the column, preferably from below the TBP entry means. Such a unit can be operated more or less continuously.

The ammonium sulfate used in the practice of this invention can be the usual commercial grade of good quality. Preferably the ammonium sulfate is free from any additives, such as anti-caking additives sometimes added to fertilizer grade material. The water used to prepare the ammonium sulfate solution can be any of good quality, but preferably distilled water or deionized water is employed to avoid any risk of introducing undesirable materials.

The invention will be better understood with reference to the following examples. It is understood that these examples are intended to be illustrative only and that it is not intended that the invention be limited thereby.

Example 1

A sample of crude TBP was obtained from the production unit. The HCl had been neutralized with sodium hydroxide, the TBP layer had been extracted once with 1% aqueous sodium hydroxide solution, and the butanol had been removed by distillation. The sodium ion concentration was 190±10 p.p.m.

A 280 ml. sample of the TBP was extracted with a 380 ml. portion of 3% aqueous ammonium sulfate solution prepared with steam condensate water by shaking for 5 minutes. The mixture was allowed to stand for 30 minutes during which time two distinct layers formed. The lower layer was drawn off and discarded and the upper layer was again extracted as before with the ammonium sulfate solution. The resulting TBP was dried at reduced pressure. It contained 0.5 p.p.m. of sodium ion.

Example 2

A sample of the same crude TBP described in Example 1 was subjected to counter-current extraction with the ammonium sulfate solution. An 18" long glass column was filled with a packing known in the art as "Penn State" packing. The column was filled with the ammonium sulfate solution (3% in deionized water). TBP feed was introduced at the bottom through an inlet means at the rate of 5 ml./min. and fresh ammonium sulfate solution was fed at the top at a rate of 10 ml./min.

Extracted TBP was removed at the top of the column by decantation and spent ammonium sulfate solution was withdrawn at the bottom and discarded.

The TBP layer was dried at reduced pressure. The sodium ion content was 6.8 p.p.m., and was determined to be of suitable quality.

I claim:

1. In a process for the production and purification of tributyl phosphate, the improvement consisting of extracting said tributyl phosphate with an aqueous solution of ammonium sulfate solution of 0.1–5% wt. concentration thereby producing tributyl phosphate having a very low sodium ion content.

2. In a process for the production of tributyl phosphate by reacting phosphorous oxychloride with an excess of butanol, neutralizing the hydrogen chloride released thereby by adding an equivalent amount of sodium hydroxide, thereby forming a layer of crude tributyl phosphate and an aqueous layer, separating said crude tributyl phosphate, extracting said tributyl phosphate with 1% sodium hydroxide solution, separating said excess of butanol by distillation, the improvement consisting of extracting said tributyl phosphate twice with an aqueous solution of ammonium sulfate, of from 0.1 to 5% by weight, and drying said tributyl phosphate under reduced pressure.

3. The process of claim 2 wherein the concentration of said ammonium sulfate is 2–3%.

4. The process of claim 2 wherein said extraction is continuous and counter-current and the feed rate of said ammonium sulfate solution is three times the feed rate of said tributyl phosphate.

References Cited

UNITED STATES PATENTS 2,552,574   5/1951   Moyle et al. _____ 260—990 X

LEWIS GOTTS, Primary Examiner

A. H. SUTTO, Assistant Examiner

U.S. Cl. X.R.

260—963, 974